United States Patent
Lee et al.

(10) Patent No.: US 10,890,688 B2
(45) Date of Patent: Jan. 12, 2021

(54) METHOD FOR GENERATING SECONDARY DATA IN GEOSTATISTICS USING OBSERVED DATA

(71) Applicant: Korea Institute of Geoscience and Mineral Resources, Daejeon (KR)

(72) Inventors: Kyungbook Lee, Daejeon (KR); Hyun Suk Lee, Daejeon (KR); Won Suk Lee, Daejeon (KR); Taehun Lee, Sejong (KR); Jungtek Lim, Gyeonggi-do (KR); Jonggeun Choe, Seoul (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 450 days.

(21) Appl. No.: 15/251,253

(22) Filed: Aug. 30, 2016

(65) Prior Publication Data
US 2017/0146690 A1  May 25, 2017

(30) Foreign Application Priority Data
Nov. 20, 2015  (KR) .................. 10-2015-0163150

(51) Int. Cl.
*G01V 99/00* (2009.01)
(52) U.S. Cl.
CPC ...... *G01V 99/005* (2013.01); *G01V 2210/665* (2013.01)
(58) Field of Classification Search
CPC ............ G01V 99/005; G01V 2210/665
(Continued)

(56) References Cited

U.S. PATENT DOCUMENTS 5,764,515 A * 6/1998 Guerillot .............. G01V 1/30
  702/2
5,838,634 A * 11/1998 Jones .................. G01V 1/282
  367/73
(Continued)

FOREIGN PATENT DOCUMENTS

KR  10-0982448 B1  9/2010
KR  10-1198776 B1  11/2012

OTHER PUBLICATIONS

Caeiro et al. ("Uncertainty Quantification for History-Matching of Non-Stationary Models Using Geostatistical Algorithms", Ninth International Geostatistics Congress, 2012, pp. 1-15).*
(Continued)

*Primary Examiner* — Iftekhar A Khan
(74) *Attorney, Agent, or Firm* — Dentons US LLP

(57) ABSTRACT

A method of generating secondary data in geostatistics using observed data that: receiving prepared spatial correlation data, primary data, and observed data; generating initial models by performing a geostatistical technique using the spatial correlation data and the primary data; extracting a best representative model using the observed data from the initial models; and creating final models by converging candidate models. The initial models are created using geostatistics from the spatial correlation data and primary data, the representative models are determined using a distance-based clustering method, the best representative model is selected using the observed data, the candidate models near the best representative model are selected as final models depending on a convergence determination criterion, and uncertainty quantification and prediction of future performances may be conducted using the final models.

3 Claims, 20 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 6,711,404 | B1* | 3/2004 | Arpee | H04W 16/18 |
| | | | | 455/423 |
| 7,363,163 | B2* | 4/2008 | Le Ra Valec-Dupin | |
| | | | | G01V 99/005 |
| | | | | 702/12 |
| 8,274,859 | B2* | 9/2012 | Maucec | G01V 99/00 |
| | | | | 367/43 |
| 8,355,898 | B2* | 1/2013 | Pyrcz | G01V 11/00 |
| | | | | 703/10 |
| 8,849,638 | B2* | 9/2014 | Brock | G01V 99/005 |
| | | | | 703/10 |
| 8,942,967 | B2* | 1/2015 | Heidari | G01V 99/00 |
| | | | | 703/10 |
| 9,260,948 | B2* | 2/2016 | Maucec | E21B 43/00 |
| 9,805,144 | B2* | 10/2017 | Le Ravalec | G06F 30/20 |
| 9,810,052 | B2* | 11/2017 | Alqahtani | E21B 43/30 |
| 10,235,518 | B2* | 3/2019 | Permeh | G06F 21/51 |
| 10,309,812 | B1* | 6/2019 | Zhang | G06F 30/20 |
| 2003/0204312 | A1* | 10/2003 | Woronow | G01V 1/364 |
| | | | | 702/14 |
| 2003/0220775 | A1* | 11/2003 | Jourdan | G01V 1/30 |
| | | | | 703/2 |
| 2006/0041409 | A1* | 2/2006 | Strebelle | G01V 1/30 |
| | | | | 703/10 |
| 2007/0055447 | A1* | 3/2007 | Mickaele | G01V 99/005 |
| | | | | 702/7 |
| 2008/0077371 | A1* | 3/2008 | Yeten | E21B 43/00 |
| | | | | 703/10 |
| 2008/0243447 | A1* | 10/2008 | Roggero | G01V 1/30 |
| | | | | 703/1 |
| 2009/0110242 | A1* | 4/2009 | Touati | G06K 9/00 |
| | | | | 382/109 |
| 2009/0164182 | A1* | 6/2009 | Pedersen | G01V 11/00 |
| | | | | 703/2 |
| 2010/0198570 | A1* | 8/2010 | Sarma | G06F 30/33 |
| | | | | 703/10 |
| 2010/0299126 | A1* | 11/2010 | Chugunov | G01V 11/00 |
| | | | | 703/10 |
| 2010/0332139 | A1* | 12/2010 | Bruun | G01V 1/282 |
| | | | | 702/18 |
| 2011/0054859 | A1* | 3/2011 | Ding | G01V 99/00 |
| | | | | 703/2 |
| 2011/0106507 | A1* | 5/2011 | Lepage | G01V 11/00 |
| | | | | 703/2 |
| 2011/0251833 | A1* | 10/2011 | Mariethoz | G01V 99/00 |
| | | | | 703/2 |
| 2012/0059641 | A1* | 3/2012 | Castellini | G01V 99/00 |
| | | | | 703/10 |
| 2013/0110483 | A1* | 5/2013 | Chugunov | G01V 99/005 |
| | | | | 703/10 |
| 2013/0110484 | A1* | 5/2013 | Hu | G06T 17/05 |
| | | | | 703/10 |
| 2013/0185033 | A1* | 7/2013 | Tompkins | G01V 11/00 |
| | | | | 703/2 |
| 2013/0218537 | A1* | 8/2013 | Le Ravalec | G01V 1/28 |
| | | | | 703/2 |
| 2013/0262051 | A1* | 10/2013 | Plost | G01V 11/00 |
| | | | | 703/2 |
| 2013/0262053 | A1* | 10/2013 | Plost | G01V 99/005 |
| | | | | 703/2 |
| 2013/0317779 | A1* | 11/2013 | Thorne | G01V 99/005 |
| | | | | 702/180 |
| 2013/0338983 | A1* | 12/2013 | Sarma | G06F 30/20 |
| | | | | 703/10 |
| 2014/0035912 | A1* | 2/2014 | Thorne | G06T 17/05 |
| | | | | 345/420 |
| 2014/0037197 | A1* | 2/2014 | Thorne | G01V 11/00 |
| | | | | 382/159 |
| 2014/0136165 | A1* | 5/2014 | Sarma | G06N 7/005 |
| | | | | 703/2 |
| 2015/0219793 | A1* | 8/2015 | Li | G06F 17/18 |
| | | | | 703/2 |
| 2016/0090825 | A1* | 3/2016 | Imhof | E21B 43/00 |
| | | | | 703/10 |
| 2016/0356125 | A1* | 12/2016 | Bello | G06Q 10/04 |
| 2017/0011149 | A1* | 1/2017 | Liu | E21B 41/00 |
| 2017/0067323 | A1* | 3/2017 | Katterbauer | E21B 41/00 |
| 2017/0114619 | A1* | 4/2017 | Conn | G06F 17/13 |
| 2017/0140079 | A1* | 5/2017 | Gentilhomme | G01V 1/282 |

OTHER PUBLICATIONS

Caers et al. (Multiple-point Geostatistics: A Quantitative Vehicle for Integrating Geologic Analogs into Multiple Reservoir Models, 2004, AAPG Memoir 80, pp. 383-394).*

Vasily Demyanov (Uncertainty in Spatial Models Geostatistics and Machine Learning, 2010, Royal Statistical Society and The Food and Environment Research Agency, pp. 1-38).*

Minasny et al. (Confronting uncertainty in model-based geostatistics using Markov Chain Monte Carlo sinnulation,2011, Geoderma , pp. 150-162).*

Minasny et al. (Confronting uncertainty in model-based geostatistics using Markov Chain Monte Carlo simulation,2011, Geoderma, pp. 150-162) (Year: 2011).*

Caeiro et al. ("Uncertainty Quantification for History-Matching of Non-Stationary Models Using Geostatistical Algorithms", Ninth International Geostatistics Congress, 2012, pp. 1-15) (Year: 2012).*

Minasny et al. (Confronting uncertainty in model-based geostatistics using Markov Chain Monte Carlo simulation, 2011, Geoderma, pp. 150-162) (Year: 2011).*

Lee et al. ("Uncertainty quantification of channelized reservoir using Ensemble Smoother with selective measurement data", Energy Exploration & Exploitation • vol. 32 • No. 5 • 2014 pp. 805-816) (Year: 2014).*

* cited by examiner

Sand faices

Background faices

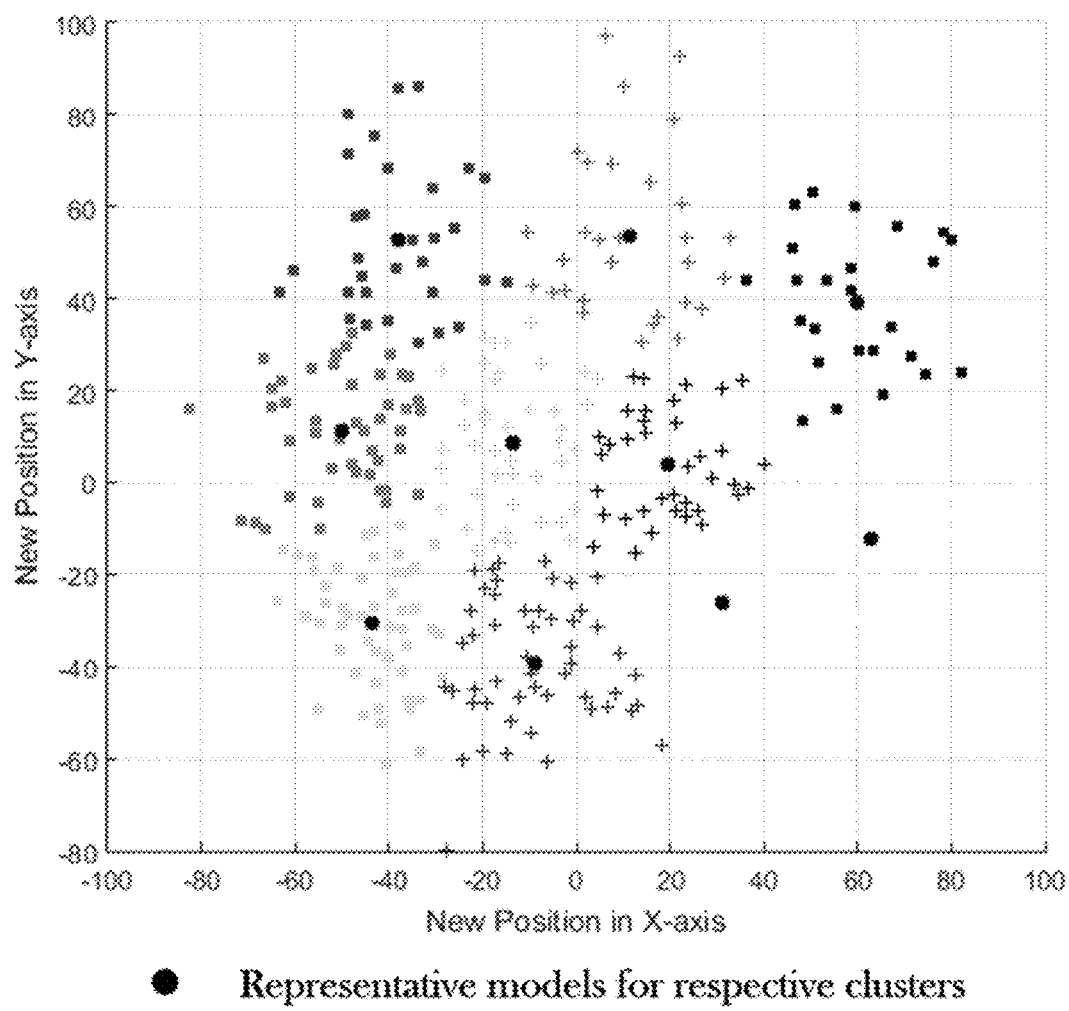

+ Selected candidate models
■ The best representative model
● Initial models

METHOD FOR GENERATING SECONDARY DATA IN GEOSTATISTICS USING OBSERVED DATA

CROSS-REFERENCE TO RELATED APPLICATION

This application claims priority to Korean Patent Application No. KR 10-2015-0163150 filed on Nov. 20, 2015 and all the benefits accruing therefrom under 35 U.S.C. § 119, the contents of which are incorporated by reference in their entirety.

BACKGROUND OF THE INVENTION

1. Field of the Invention

The present invention generally relates to a method for generating secondary data in geostatistics using observed data. More particularly, the present invention relates to a method for generating secondary data in geostatistics using observed data, which creates initial models from spatial correlation data (or spatial distribution data) and primary data (or hard data) using geostatistics, selects representative models among the models using a distance-based clustering technique, or the like, chooses the best representative model using the observed data (or dynamic data), selects candidate models near the best representative model, and regenerates new models using geostatistics together with the existing static data (spatial correlation data and primary data) while utilizing the mean of the candidate models as secondary data (or soft data), and which may select final models through the repetition of the above procedure and may perform uncertainty quantification and prediction of future performances using the final models.

2. Description of the Related Art

Generally, geostatistics is a technique used in various fields, such as geology, environmentology, and meteorology. Geostatistics is a technique for evaluating a value of interest located at an unknown place by analyzing hard data known and spatial characteristics of the data. For example, when the acquisition of site information is limited due to the problem of time and costs, geostatistics may predict and analyze data for a section in which site surveying cannot be conducted by maximally utilizing the limited site information. Further, geostatistics may use the predicted and analyzed data as essential data for various objectives, such as planning a structure, drilling, construction or environment work, or predicting weather conditions.

At present, to perform a geostatistical technique, initial static data, for example, spatial correction data, primary data, and secondary data, are required. In order to reduce the uncertainty of geostatistics, reliable secondary data are needed. However, a problem arises in that to acquire the secondary data, separate experiments or investigation procedures are required, thus resulting in additional time and costs therefor.

Observed data are not used in geostatistics, but they have been used to improve models via inverse modeling techniques by utilizing the models as the initial models that are the results of performing geostatistical techniques. In this case, there are limitations in that the time and costs for inverse modeling techniques are greatly increased, and the results of inverse modeling techniques cannot preserve spatial correlation data and primary data used when geostatistical techniques are performed.

SUMMARY OF THE INVENTION

Accordingly, the present invention has been made keeping in mind the above problems occurring in the prior art. An object of the present invention is to provide a method for generating secondary data in geostatistics using observed data, which generates secondary data using observed data, and creates more reliable models than that can be created when only spatial correlation data and primary data are applied to geostatistics, by applying the secondary data generated, together with the spatial correlation data and the primary data given, to geostatistics. In detail, the present invention provides a method for generating secondary data in geostatistics using observed data, which selects representative models using a distance-based clustering method and chooses the best representative model using observed data. Further, the present invention selects candidate models near the best representative model and creates new initial models using geostatistics together with the existing static data (spatial correlation data and primary data) while utilizing the mean model of the candidate models as secondary data. Furthermore, the present invention selects final models by repeating the above procedure, and is capable of performing uncertainty quantification and prediction of future performances using the final models.

In order to accomplish the above object, the present invention provides a method for generating secondary data in geostatistics using observed data, include receiving prepared spatial correlation data, primary data, and observed data; generating initial models by performing a geostatistical technique using the spatial correlation data and the primary data; extracting a best representative model using the observed data from the initial models; and creating final models by converging candidate models.

Here, the method may further include, after creating the final models, performing uncertainty quantification and prediction of future performances using the final models.

Here, generating the initial models may include creating the initial models using any one of sequential simulation, an object-based method, and multiple-point simulation.

Here, extracting the best representative model may include forming a plurality of clusters by grouping similar models among the created initial models using a distance-based method; selecting representative models for the plurality of clusters, respectively; performing dynamic simulation on the representative models; and selecting the best representative model having prediction values most similar to the observed data from among the representative models by comparing the observed data with results of the simulation.

Here, creating the final models may include selecting candidate models near the best representative model in a sequence of closeness from results of performing the distance-based method; calculating the mean of the selected neighboring candidate models; determining whether the calculated mean model has converged; if it is determined at that the mean model does not converge, selecting the mean model as secondary data; repeating generating initial models to determining whether the calculated mean model has converged using the spatial correlation data and the primary data, together with the secondary data; and if it is determined at determining that the mean model has converged, setting the selected neighboring candidate models as the final models.

BRIEF DESCRIPTION OF THE DRAWINGS

The above and other objects, features and advantages of the present invention will be more clearly understood from the following detailed description taken in conjunction with the accompanying drawings, in which:

FIGS. 7A and 7B are diagrams showing a procedure for determining representative models by the distance-based method of FIG. 3 and for determining the best representative model using an observation error according to an embodiment of the present invention;

DESCRIPTION OF THE PREFERRED EMBODIMENTS

Hereinafter, embodiments of the present invention will be described in detail with reference to the attached drawings.

For each step, all processing corresponding to each step is processed by the computer devices and peripherals. That is, the input is processed by the input device such as a keyboard output is processed by a device such as a display monitor, and operation processing is performed by a computer processor. It is apparent that this process is processed by the computer devices and peripherals.

Figure 1:
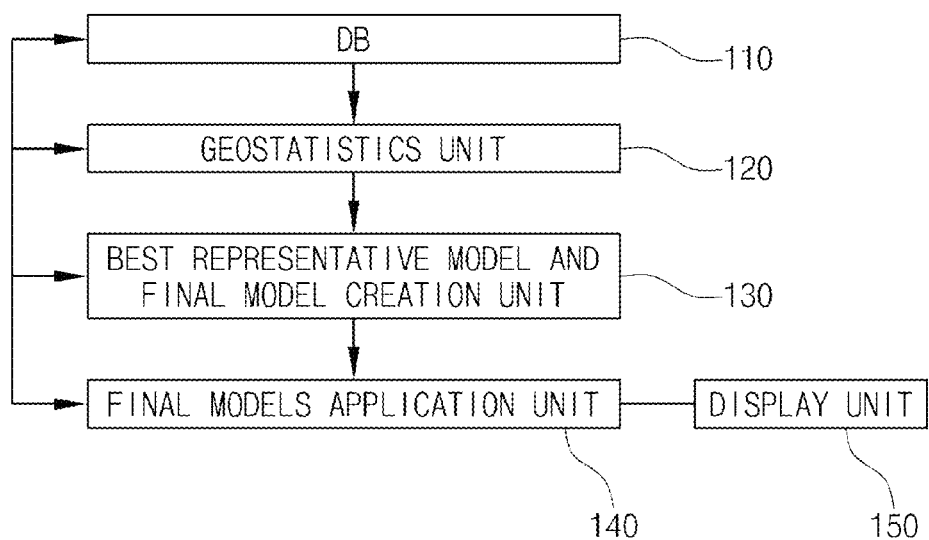
FIG. 1 is a block diagram schematically showing the configuration of a system for performing a geostatistical technique according to an embodiment of the present invention.

FIG. 1 is a block diagram schematically showing the configuration of a system for performing a geostatistical technique according to an embodiment of the present invention.

Referring to FIG. 1, a database (DB) 110 may store spatial correlation data (spatial distribution data), primary data (hard data), and observed data, and also store secondary data (soft data) generated via operations. However, the primary data and the secondary data are not essential data. Here, as the spatial correlation data, variograms or training images may be used.

A geostatistics unit 120 creates initial models using geostatistics from the spatial correlation data and the primary data or the secondary data generated via operations. For example, the geostatistics unit 120 may be implemented using sequential simulation, an object-based method, multiple point simulation, or the like. For example, in the case of reservoir engineering, facies models or petrophysical models may be created using sequential indicator simulation, an object-based method, multiple point simulation, or the like.

A best representative model and final models creation unit 130 clusters similar models among a plurality of initial models, created based on geostatistics, depending on a distance-based method in order to choose the best representative model. Representative models are selected for respective clusters, and dynamic simulation is performed on the representative models. The observed data are compared with the results of simulation, and then the best representative model having prediction values most similar to the observed data among the representative models is selected.

The best representative model and final models creation unit 130 selects some of neighboring candidate models close to the best representative model using the distance-based method so as to calculate mean model from the selected candidate models and determine whether the mean model has sufficiently converged, and define final models. For example, an example of a criterion for convergence determination may be a difference between a previous mean model and the current mean model. If the difference does not satisfy the convergence determination criterion, secondary data is generated from the mean model of the selected candidate models. When a geostatistical technique is performed again to regenerate initial models, the secondary data is used together with the existing spatial correlation data and primary data. For example, since there is no secondary data to be compared in the first loop, the generated-first secondary data are utilized to regenerate initial models for the second loop. Whether the convergence determination criterion is satisfied may be determined by comparing the currently generated-second secondary data with the previously generated-first secondary data. For example, it may be determined that convergence has been realized when the second secondary data that is the currently generated secondary data matches the first secondary data that is the previous secondary data within a range of 95%.

When this procedure is repeated by the best representative model and final models creation unit 130 and then the mean model has sufficiently converged, final models application unit 140 selects the current candidate models as the final models that have sufficiently converged as final models. When dynamic simulation is performed on the final models, uncertainty quantification and prediction of future performances may be conducted.

In this way, the results of processing respective steps may be displayed on a display unit 150. The procedures shown in the drawings, which will be described later, may be checked by an operator via the display unit 150, and thus the reliability of prediction and uncertainty quantification may be approximately determined.

Figure 2:
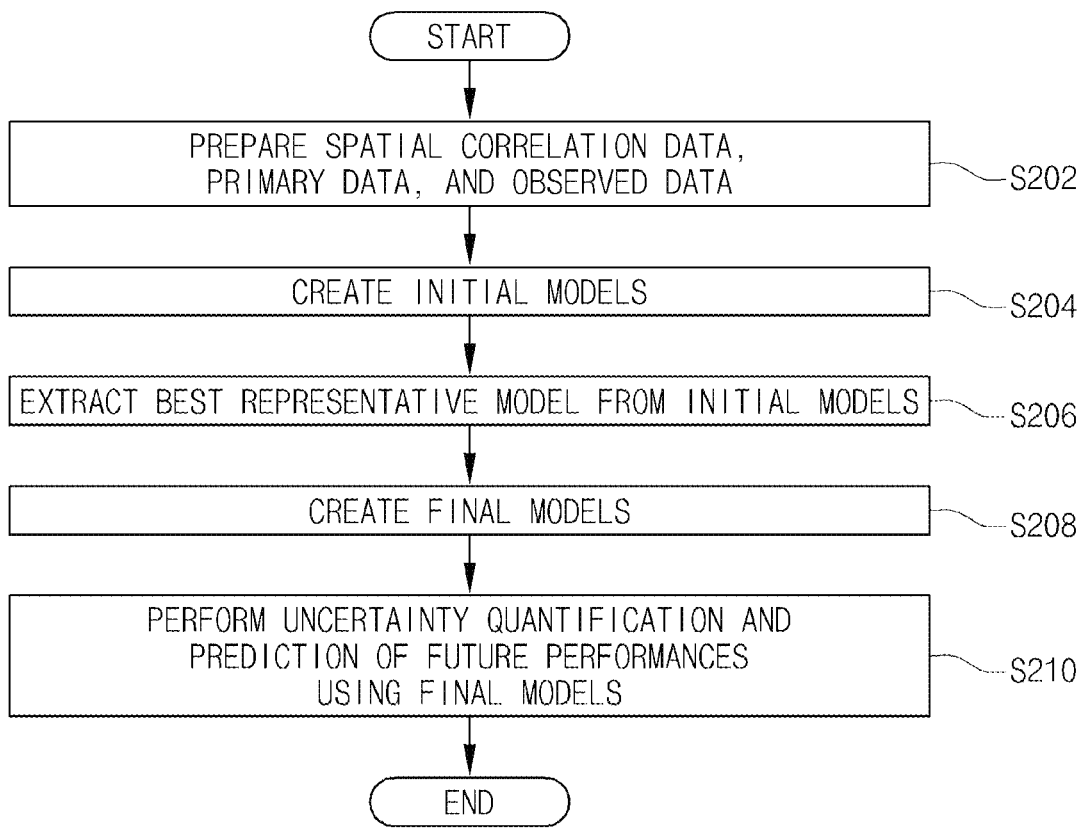
FIG. 2 is a flowchart showing a procedure for creating final models using spatial correlation data, primary data, and observed data according to an embodiment of the present invention.
Figure 3:
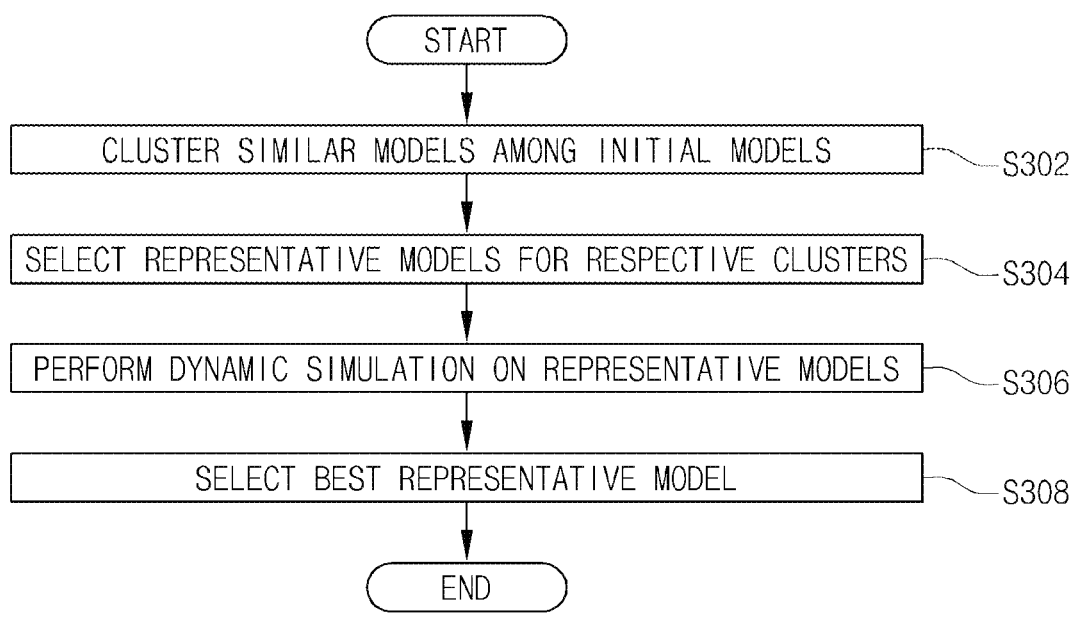
FIG. 3 is a flowchart showing in detail the best representative model extraction step of FIG. 2 according to an embodiment of the present invention.
Figure 4:
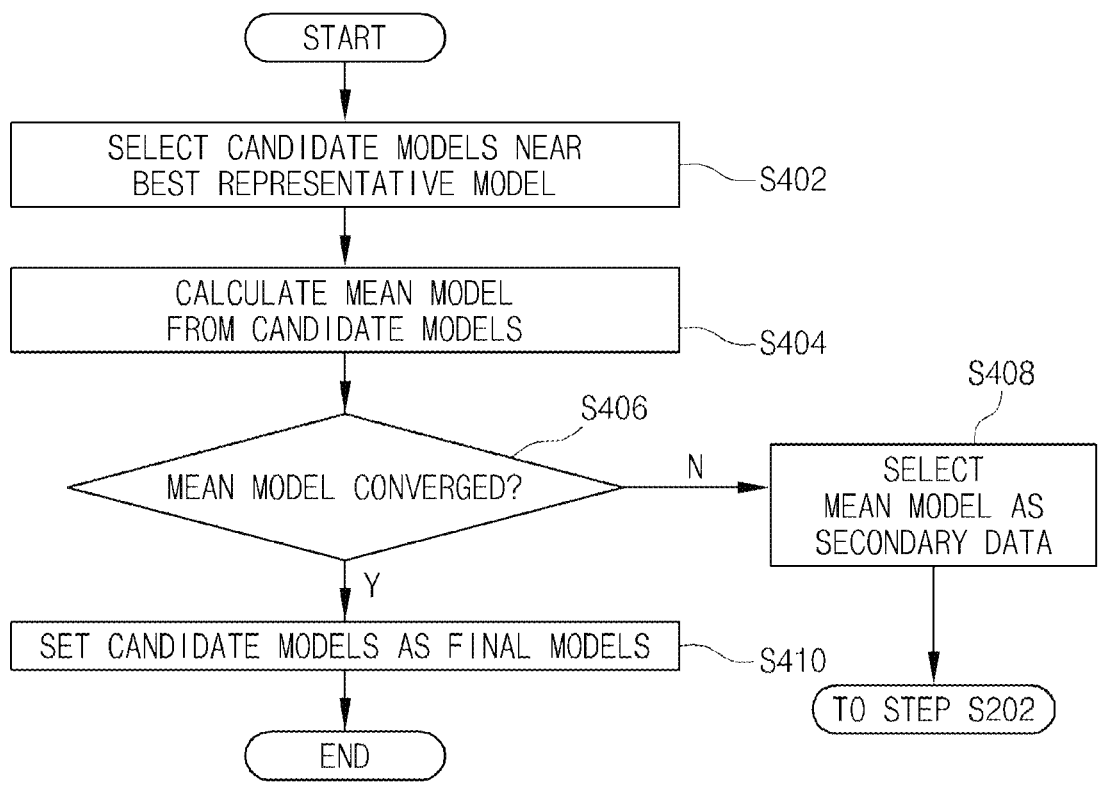
FIG. 4 is a flowchart showing a procedure for creating final models of FIG. 2 according to an embodiment of the present invention.
Figure 5A:
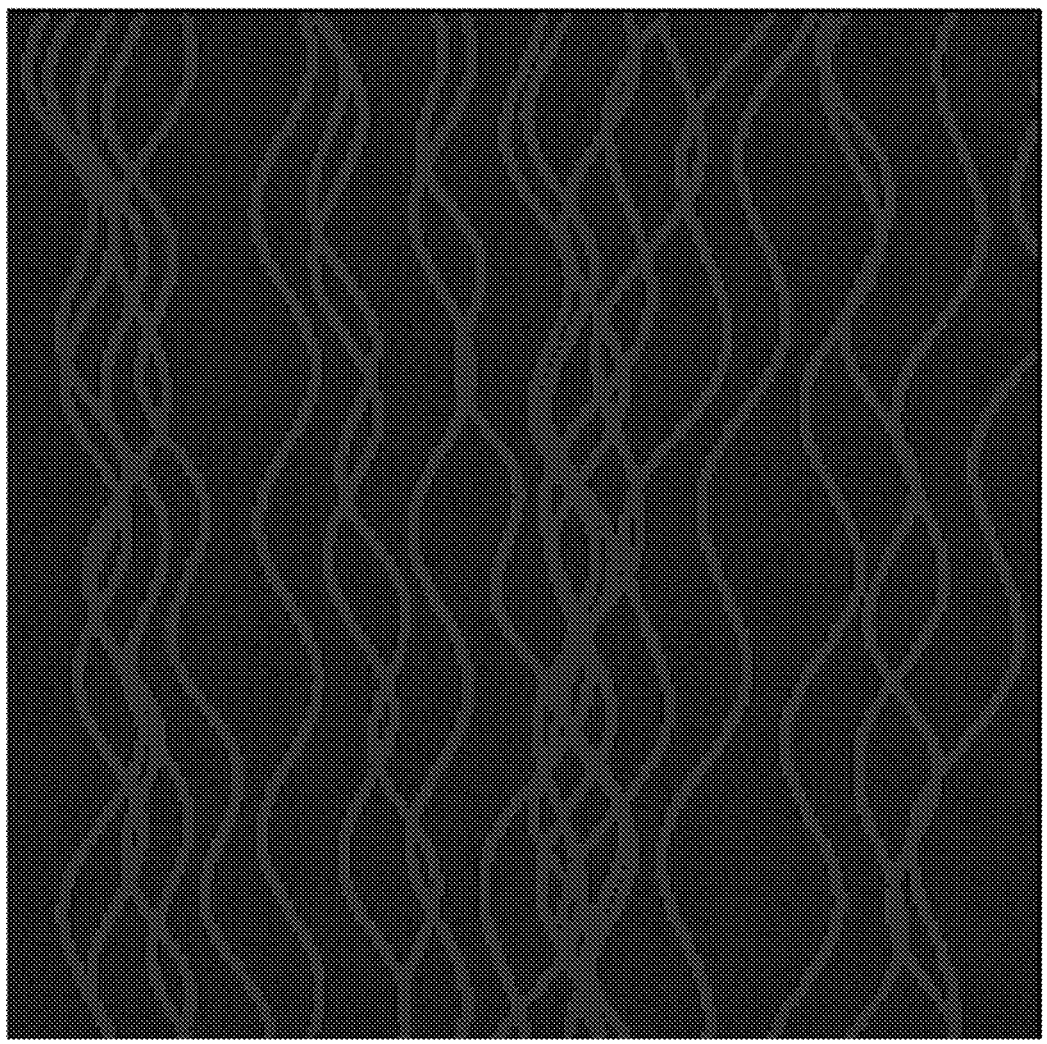
FIGS. 5A to 5C are diagrams showing pieces of data used as input (spatial correlation, primary data, and observed data) according to an embodiment of the present invention.
Figure 5A:
Figure 5A:
Figure 5B:
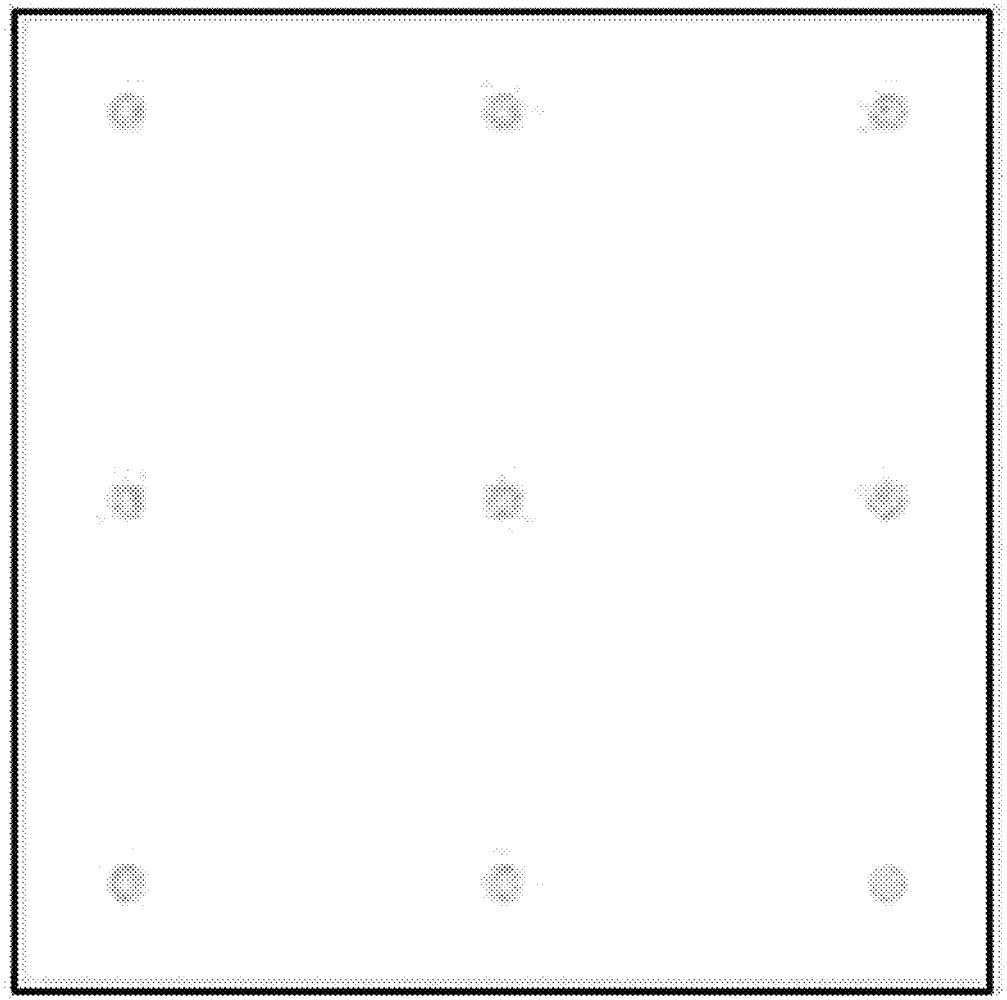
Figure 5C:
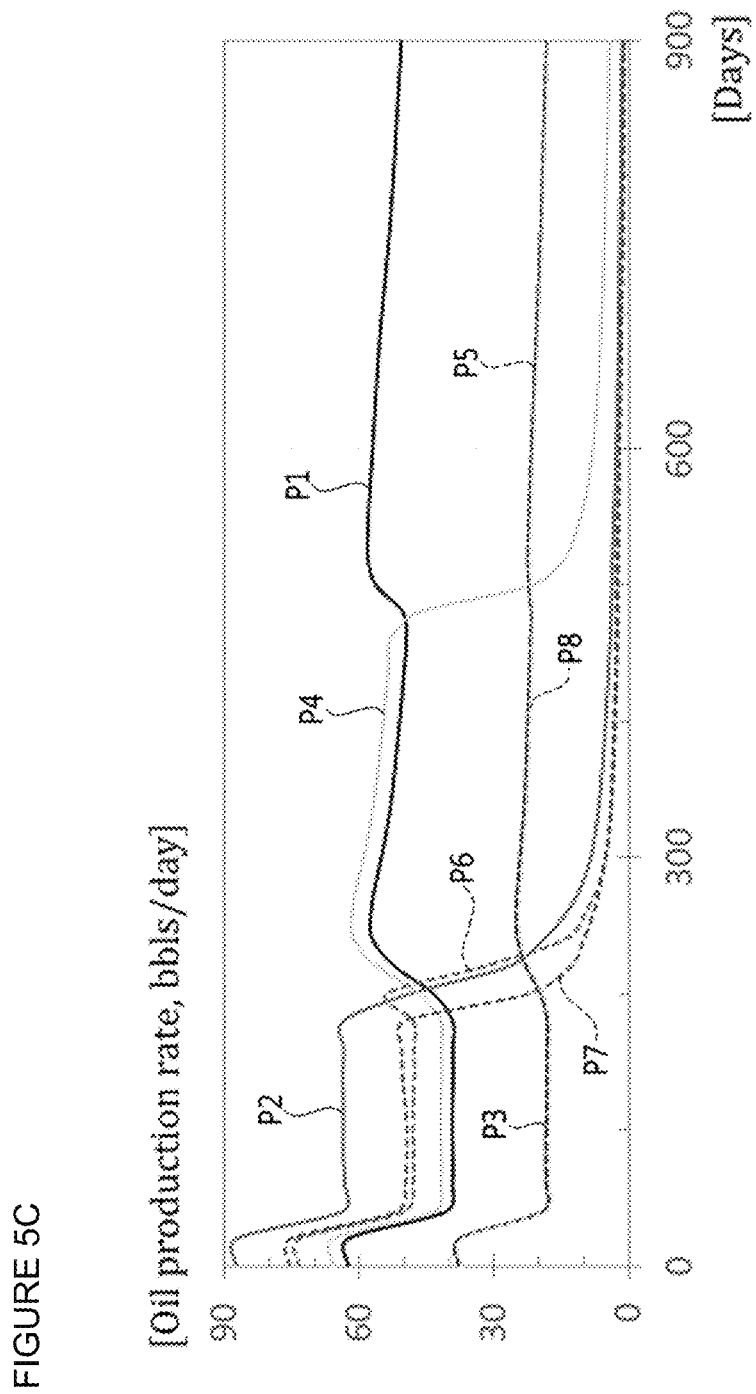
Figure 6:
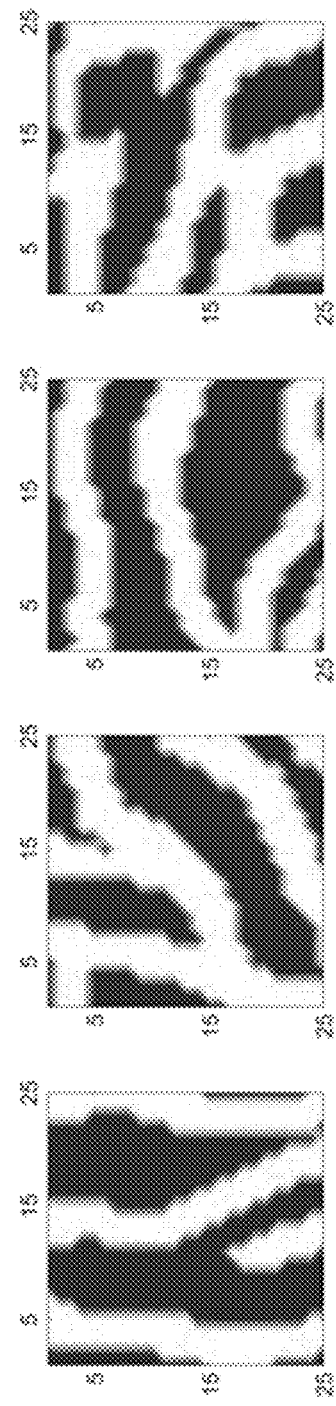
FIG. 6 is a diagram showing initial models created based on geostatistics using the data of FIG. 2 according to an embodiment of the present invention.
Figure 7B:
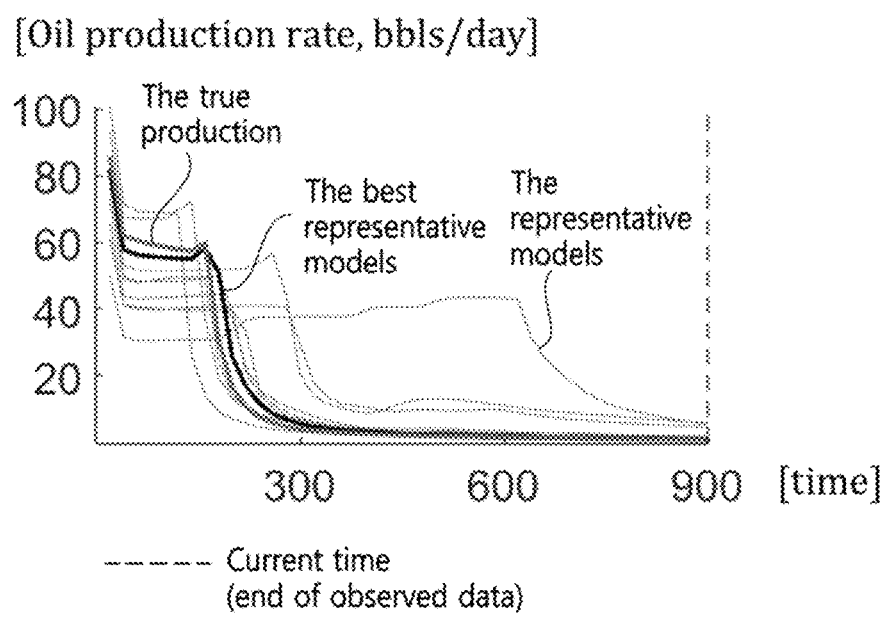
Figure 8A:
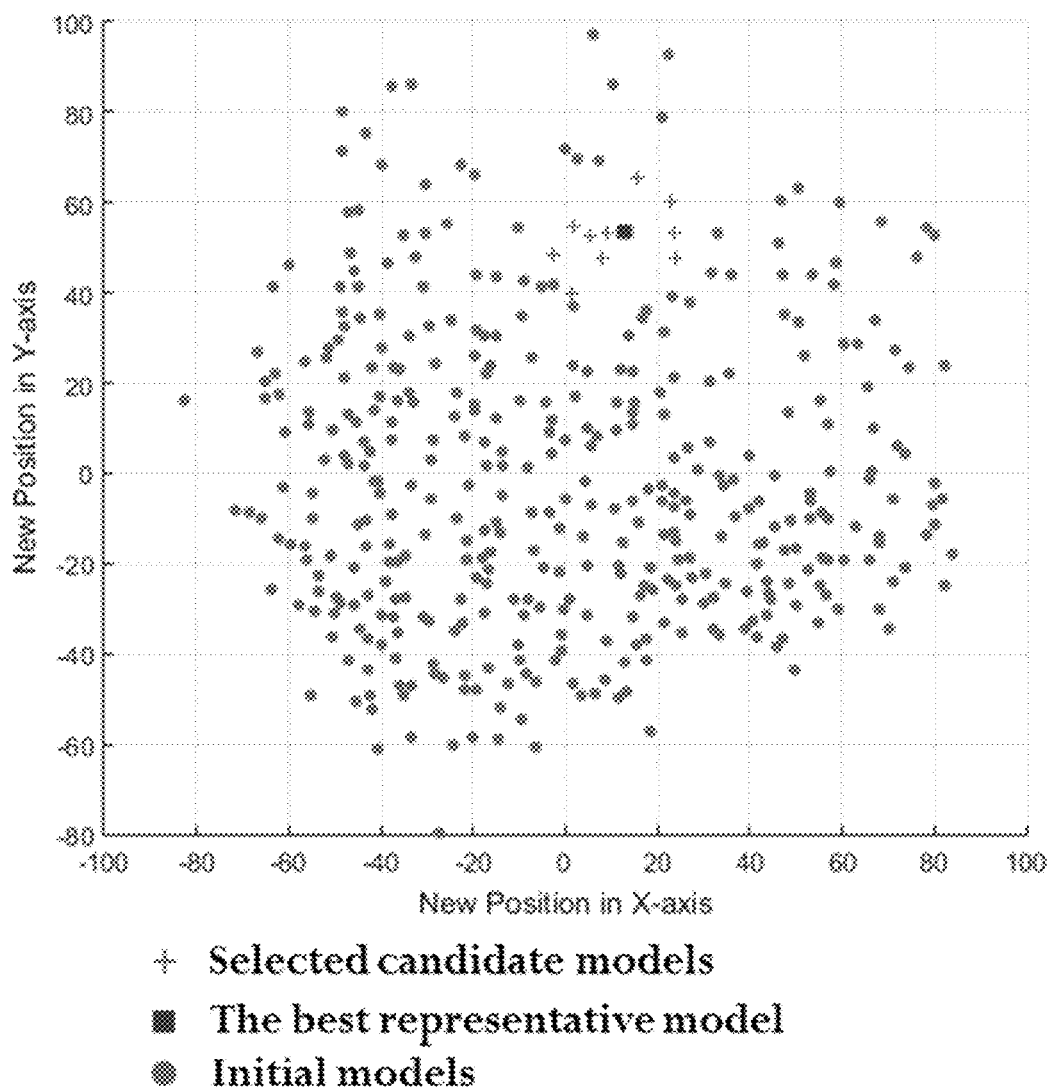
FIGS. 8A to 8C are diagrams showing selected candidate models (plus-sign models) near the best representative model (square model) in a sequence of closeness in FIG. 4, and the mean of the candidate models according to an embodiment of the present invention.
Figure 8B:
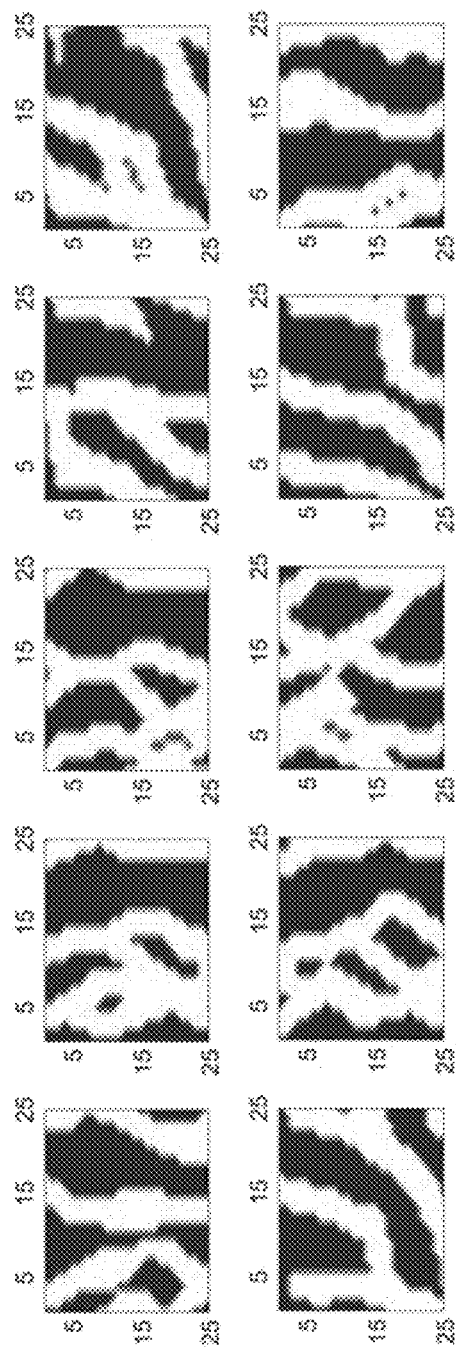
Figure 8C:
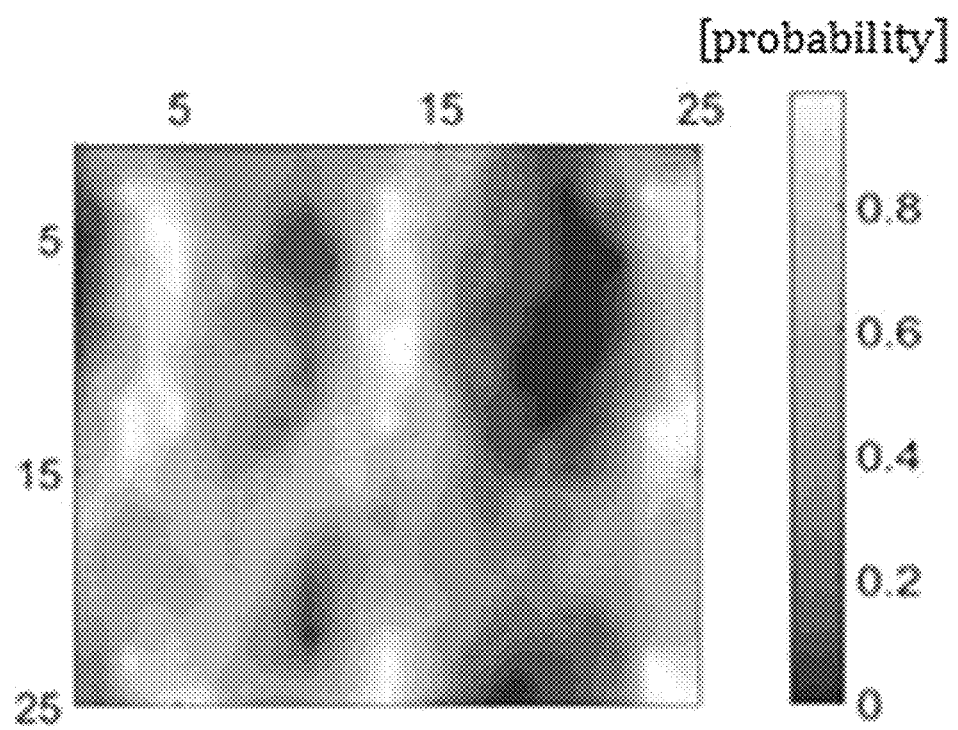
Figure 9A:
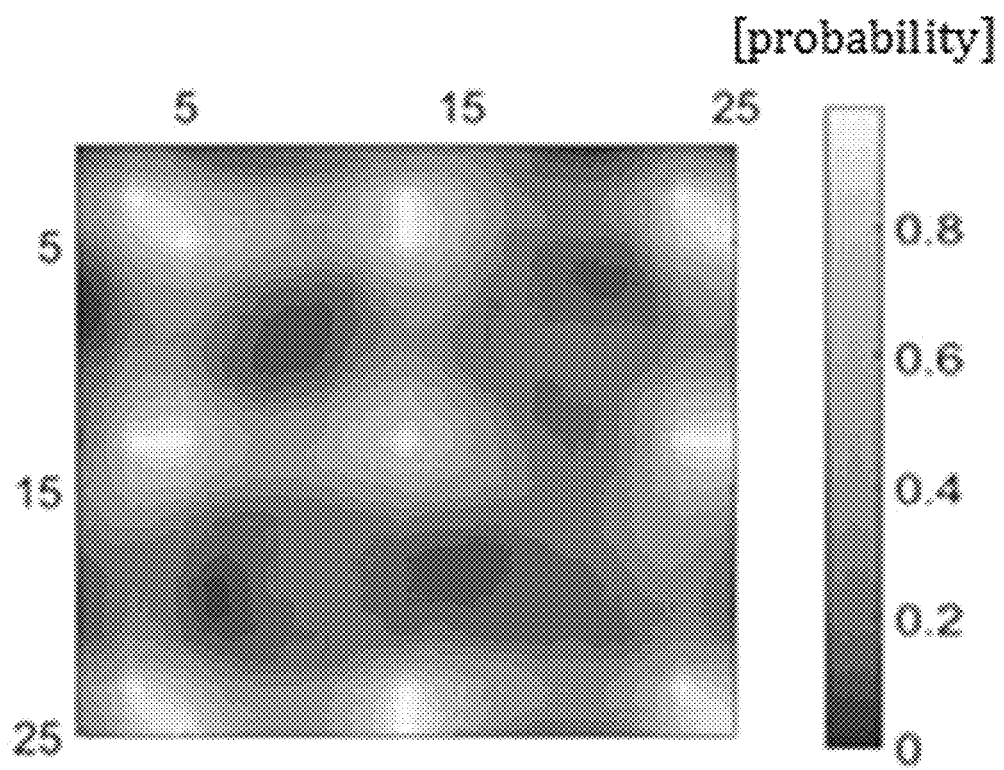
FIGS. 9A to 9C are diagrams showing a difference between the mean model of initial models including example models in FIG. 6 and the mean model of regenerated initial models, which are newly created based on geostatistics using the static data of FIG. 5 and the secondary data of FIG. 8C via a repetition procedure based on a criterion for convergence determination of FIG. 4, together with a reference model, according to an embodiment of the present invention.
Figure 9B:
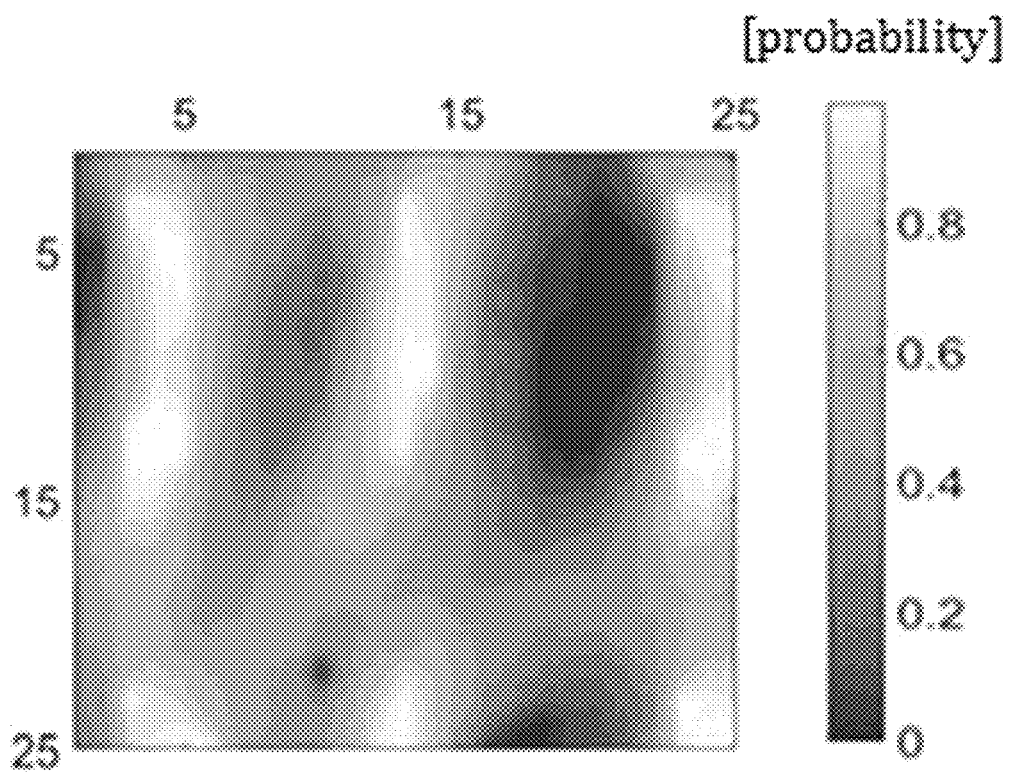
Figure 9C:
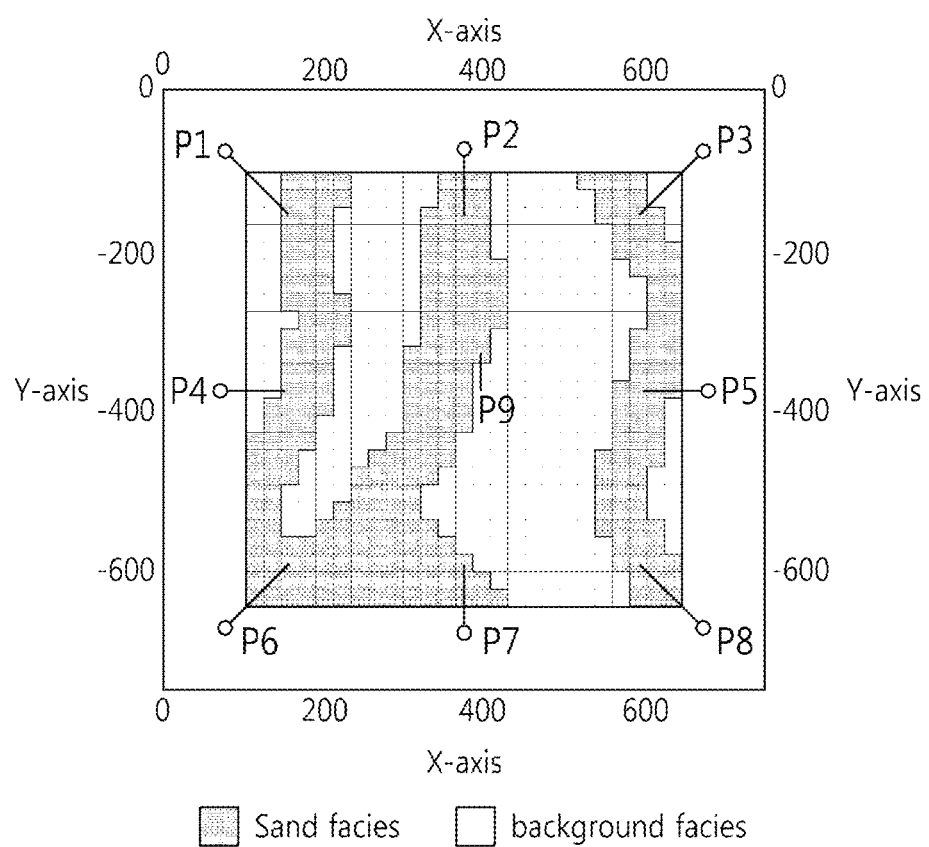
Figure 10A:
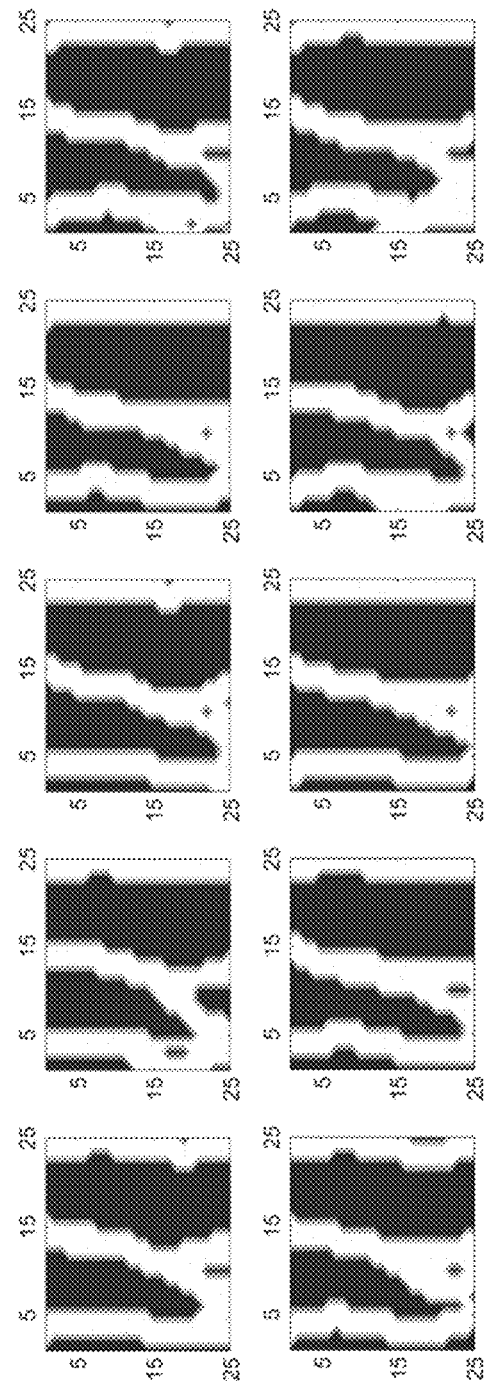
FIGS. 10A and 10B are diagrams showing final models obtained via a repetition procedure based on the convergence determination criterion of FIG. 4 and the mean of the final models according to an embodiment of the present invention.
Figure 10B:
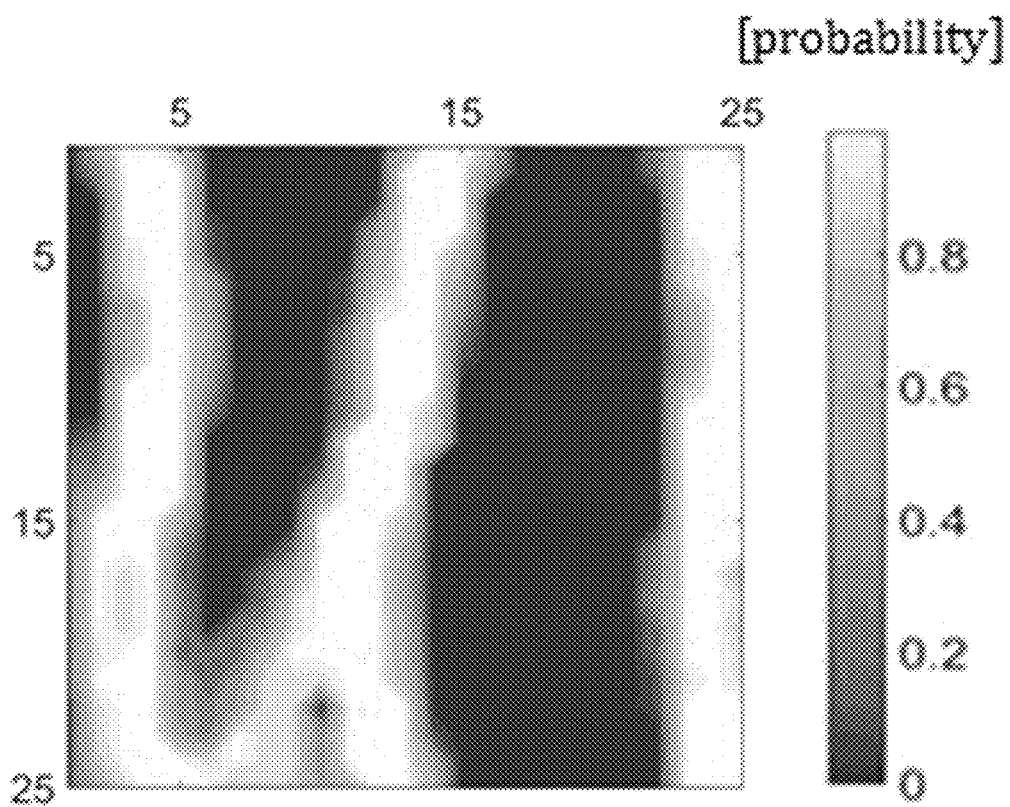
Figure 11A:
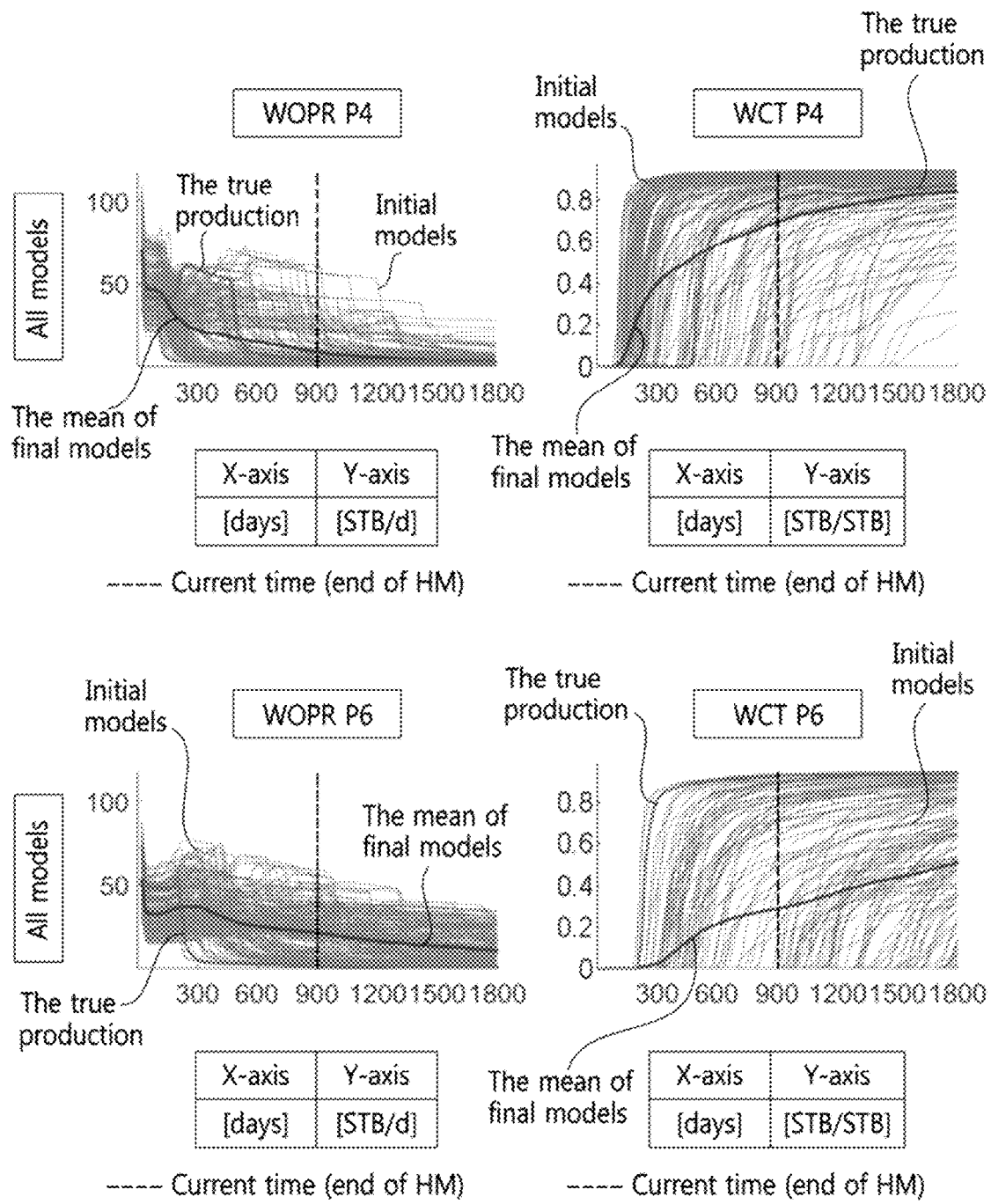
FIGS. 11A and 11B are diagrams showing differences between the results of the initial models including example models in FIG. 6 and the results of performing prediction of future performances and uncertainty quantification on the final models of FIG. 10A according to an embodiment of the present invention.
Figure 11B:
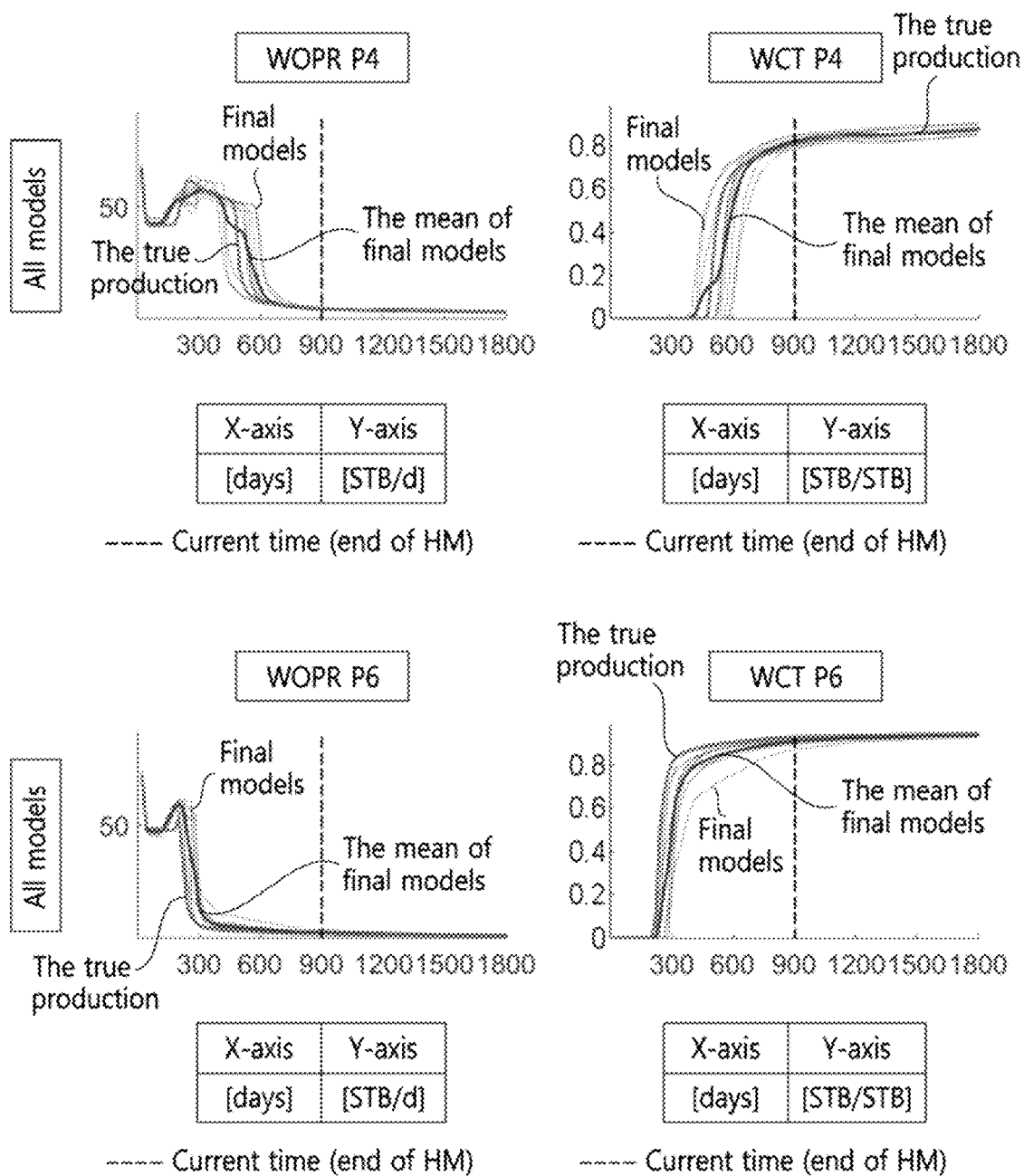

FIG. 2 is a flowchart showing a procedure using spatial correlation data, primary data, and observed data according to an embodiment of the present invention, FIG. 3 is a flowchart showing in detail the best representative model extraction step of FIG. 2 according to an embodiment of the present invention, FIG. 4 is a flowchart showing a procedure for creating final models of FIG. 2 according to an embodiment of the present invention, FIGS. 5A to 5C are diagrams showing pieces of data used as input (spatial correlation, primary data, and observed data) according to an embodiment of the present invention, FIG. 6 is a diagram showing initial models created based on geostatistics using the data of FIG. 2 according to an embodiment of the present invention, FIGS. 7A and 7B are diagrams showing a procedure for determining representative models by the distance-based method of FIG. 3 and for determining the best representative model using an observation error according to an embodiment of the present invention, FIGS. 8A to 8C are diagrams showing selected candidate models (red colored models) near the best representative model (blue colored model) in a sequence of closeness in FIG. 4, and the mean of the red colored models according to an embodiment of the present invention, FIGS. 9A to 9C are diagrams showing a difference between the mean model of initial models including example models in FIG. 6 and the mean model of regenerated initial models, which are newly created based on geostatistics using the static data of FIG. 5 and the secondary data of FIG. 8C via a repetition procedure based on a criterion for convergence determination of FIG. 4, together with a reference model, according to an embodiment of the present invention, FIGS. 10A and 10B are diagrams showing final models obtained via a repetition procedure based on the convergence determination criterion of FIG. 4 and the mean of the final models according to an embodiment of the present invention, and FIGS. 11A and 11B are diagrams showing differences between the results of the initial models including example models in FIG. 6 and the results of performing prediction of future performances and uncertainty quantification on the final models of FIG. 10A according to an embodiment of the present invention.

At step S202 of FIG. 2, computer are receiving prepared spatial correlation data, primary data, and observed data in the DB 110. When there are the spatial correlation data and the observed data, the method of the present invention may be used, and primary data and secondary data are not essential data. Here, as the spatial correlation data, variograms or training images may be used.

FIG. 5A illustrates a training image. As described above, the training image is geologic concept data as the spatial correlation data. FIG. 5B illustrates primary data, which are either core data obtained through drilling or data obtained from geophysical well logging or the like. FIG. 5C illustrates observed data, and shows well oil production rates (WOPR) over time for respective production wells shown in FIG. 9C. As described above, the DB 110 may store spatial correlation data, that is, the training image, the primary data, and the observed data, and may selectively include secondary data. Data points in FIG. 5B are implemented in a 25×25 grid system, and nine points for which it is known that the component of data is sand or shale are shown as the primary data. The remaining 616 points have uncertainty. Therefore, the geostatistics unit 120 creates initial facies models, as shown in FIG. 6, via geostatistics corresponding to step S204 of FIG. 2. In four initial models, lighter portions denote sand facies, and darker portions denote shale facies. Although only four facies models are shown in the drawing for the convenience of description, the geostatistics unit 120 actually creates hundreds of initial facies models.

At step S206, the best representative model and final models creation unit 130 extracts the best representative model from the initial models.

At step S208, the best representative model and final models creation unit 130 creates final models by converging candidate models.

At step S210, the final models application unit 140 performs uncertainty quantification and prediction of future performances using the final models. In this way, the results of performing uncertainty quantification and prediction of future performances may be displayed on the display unit 150.

Referring to FIG. 3, the above-described step of extracting the best representative model includes the following steps.

First, at step S302, the best representative model and final models creation unit 130 forms a plurality of clusters by grouping similar models among the created initial models using a distance-based method.

At step S304, the best representative model and final models creation unit 130 selects representative models for the plurality of clusters, respectively.

At step S306, the best representative model and final models creation unit 130 performs dynamic simulation on the representative models.

At step S308, the observed data is compared with the results of simulation, and thus the best representative model having prediction values most similar to the observed data is selected from among the representative models.

Referring to FIG. 7, the representative models clustered using the distance-based method may be obtained in the form of black points, as shown in FIG. 7A. Respective symbols indicate clustered groups. In FIG. 7B, the results of simulation for the representative models (the grey lines) are compared with the observed data (the red line). The black solid line becomes the best representative model since it has the lowest error with the true production.

Referring to FIG. 4, a procedure for creating final models will be described in detail.

At step S402, the best representative model and final models creation unit 130 selects some of neighboring candidate models close to the best representative model. In FIG. 8A, ten plus symbols denote the selected candidate models among the initial models (points or circles) near the best representative model (square).

At step S404, the best representative model and final models creation unit 130 calculates the mean model from the selected candidate models. The ten candidate models are illustrated in FIG. 8B, and the mean model of the ten models is illustrated in FIG. 8C. In FIG. 8B, lighter portions denote sand, and darker portions denote shale and in FIG. 8C, shading denotes probability of sand facies.

At step S406, the best representative model and final models creation unit 130 determines whether the calculated mean model has converged. As described above, whether the mean model has converged may be determined using a difference between the previous mean model and the current mean model. That is, when the difference falls within a predetermined reference range, it may be determined that the current mean model has converged, whereas when the difference falls out of the predetermined reference range, it may be determined that the current mean model does not converge.

If it is determined at step S406 that the mean model does not converge, the mean model of the selected candidate models is utilized as secondary data at step S408. Steps S202 to S406 are repeatedly performed using the selected secondary data together with the spatial correlation data and the primary data prepared, and the observed data at step S202.

FIG. 9A illustrates the mean model of the initial models created in the first loop at step S204. After steps S206 to S406 are performed once using the initial models, new initial models re-created in the second loop at step S204, which may be acquired based on geostatistics by the secondary data, generated in FIG. 8C, together with the spatial correlation data in FIG. 5A and the primary data in FIG. 5B. The mean of the regenerated initial models is shown in FIG. 9B. FIG. 9C illustrates the reference model, which cannot be actually known, but is given so as to determine the precision of the technique. Therefore, it can be seen that the mean model of the initial models in the second loop, which is re-created using the secondary data based on the observed data, in FIG. 9B is more similar to the reference model of FIG. 9C that is the true model, than the mean model of initial models in the first loop, which is created using only the spatial correlation data and the primary data, shown in FIG. 9A.

However, the mean model in FIG. 9B does not necessarily indicate the final model. When steps S206 to S406 are repeated using the re-created initial models, and it is determined at step S406 that the mean model has converged, the candidate models near the best representative model, which are used to obtain the current mean model, are determined to be the final models at step S410.

In FIG. 10A, it can be seen that the candidate models determined to be the final models in the state in which steps S204 to S406 are accumulatively repeated are illustrated, and the mean model of the final models is shown as FIG. 10B, which is very similar to the reference model in FIG. 9C. The convergence determination criterion cannot be the reference model shown in FIG. 9C because it is an unknown value. Thus, the mean model of the candidate models in a previous loop is compared with the mean model of the candidate models in the current loop, and it may be determined that the current mean model has converged if the mean models match each other within the predetermined range. That is, if it is determined that the mean model has converged, the candidate models near the best representative model in the current loop may be set as the final models.

At step S210 of FIG. 2, uncertainty quantification and prediction of future performances are conducted on the final models. Referring to FIGS. 11A and 11B, FIG. 11A illustrates results obtained by performing dynamic simulation on the hundreds of initial models in the first loop. In the drawings, WOPR P4 denotes WOPR at production well P4 in FIG. 9C, and WCT P4 denotes a water-cut (WCT: the ratio of water production to the total liquid production, such as for water and oil) at production well P4. In the same way, WOPR P6 and WCT P6 denote WOPR and WCT at production well P6 in FIG. 9C. In FIG. 11, each red line denotes the observed data for the reference model in FIG. 5C, each grey line denotes the future prediction via dynamic simulation based on the initial models in FIG. 11A or the final models in FIG. 11B, and each blue line denotes the mean of the grey lines. Each black vertical dotted line denotes the current time (the end of history matching time), wherein the left side of the dotted line denotes a period in which observed data are obtained, and the right side of the dotted line denotes a period in which future prediction is performed. In FIG. 11A, the results of the initial models have high uncertainties, and the mean of the results has a large difference from the observed value. However, it can be seen that uncertainties of the results of simulation using the final models in FIG. 10A are dramatically reduced as shown in FIG. 11B, and a difference between the blue line and the red line is also greatly decreased. Further, FIG. 11A requires hundreds of dynamic simulations, whereas FIG. 11B requires only dynamic simulations of the final models, and thus the scheme in FIG. 11B enables prediction of the future production rate and uncertainty quantification to be reliably conducted while reducing simulation time and costs.

As described above, the method for generating secondary data in geostatistics using observed data according to the present invention is advantageous in that initial models are created using geostatistics from spatial correlation data and primary data, representative models are determined using a distance-based clustering method, a best representative model is selected using observed data, candidate models near the best representative model are selected as final models depending on a convergence determination criterion, and both uncertainty quantification and prediction of future performances may be conducted using the final models. By means of this, additional time and costs for the generation of secondary data may be reduced. Further, the present invention is advantageous in that the observed data may be integrated to generate secondary data that is one of geostatistical parameters, without performing inverse modeling, thus solving the conventional problems in which the results of inverse modeling techniques cannot preserve spatial correlation data and primary data, and enabling the realistic final models to be created. Also, simulation time and costs, required when inverse modeling is performed so as to integrate the observed data, may be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the technical scope of the present invention should be defined by the technical spirit of the accompanying claims.

What is claimed is:

1. A computer-implemented method for generating and using soft data in geostatistics using observed data, the method comprising:

receiving, via a computer, prepared spatial correlation data, hard data, and observed data;

generating, via the computer, initial models by performing a geostatistical technique using the spatial correlation data and the hard data;

extracting, via the computer, a best representative model from the initial models using the observed data and a distance-based clustering method and then, selecting, via the computer, candidate models surrounding the best representative model using the distance-based clustering technique;

determining via the computer, final models after determining that a mean model of the candidate models has converged, but otherwise setting the mean model as the soft data and then repeating the foregoing sequence of steps using the soft data in addition to the prepared spatial correlation data, the hard data, and the observed data; and after determining a final model, performing, via the computer, dynamic simulation using the final models to estimate uncertainty quantification of future reservoir performance, wherein, (a) extracting the best representative model comprises (1) forming, via the computer, a plurality of clusters by grouping similar models among the created initial models using the distance-based clustering technique, (2) selecting, via the computer, respective representative models for the plurality of clusters, (3) performing, via the computer, dynamic simulation on the representative models; and (4) selecting, via the computer, the best representative model having a prediction value most similar to the observed data from among the representative models by comparing the observed data with results of the simulation, (b) creating the final models and the soft data comprises (1) selecting, via the computer, the candidate models near the best representative model in a sequence of closeness from results of performing the distance-based clustering technique, (2) calculating, via the computer, the mean model of the selected candidate models, (3) determining, via the computer, whether the calculated mean model has converged, (4) if it is determined the mean model has not converged, setting, via the computer, the mean model as the soft data, and (5) if it is determined that the mean model has converged, setting, via the computer, the selected candidate models as the final models, (c) the spatial correlation data and the hard data remain unchanged, and (d) the hard data are either core data obtained from drilling or data obtained from geophysical well logging.

2. The method of claim 1, wherein generating the initial models comprises creating the initial models using any one of sequential simulation, an object-based technique, and multiple-point simulation.

3. A computer-implemented method for generating and using soft data in geostatistics using observed data, the method comprising:

receiving prepared spatial correlation data, hard data, observed data;

generating initial models by performing a geostatistical technique using the spatial correlation data, the hard data;

clustering the initial models into a plurality of clusters using a distance-based clustering technique and extracting a respective representative model from each cluster;

performing dynamic simulation on the respective representative models;

selecting a best representative model from the respective representative models using the observed data and results of the dynamic simulation, by selecting one representative model that is most similar to the observed data;

selecting candidate models located about the best representative model in a sequence of closeness from results of performing the distance-based clustering technique;

generating a current mean model from the candidate models;

determining whether the current mean model is converged by determining whether the current mean model is sufficiently similar to a prior mean model using a predetermined range of difference;

setting the candidate models as final models if the current mean model is determined to be converged or setting the current mean model as the soft data and repeating the foregoing sequence of steps using the soft data in addition to the prepared spatial correlation data, the hard data, and the observed data if the current mean model is not determined to he converged;

performing uncertainty quantification and prediction of future performances using the final models; and displaying on a display results of the performing uncertainty quantification and prediction of future performances using the final models, wherein, the spatial correlation data and the hard data remain unchanged, the hard data are either core data obtained from drilling or data obtained from geophysical well logging, the observed data are well oil production rates over time, and the future performances are water cut and well oil production rates of production wells.

* * * * *